(12) United States Patent
Wan et al.

(10) Patent No.: US 11,265,714 B2
(45) Date of Patent: Mar. 1, 2022

(54) SYSTEMS AND METHODS FOR SUBSCRIBER CERTIFICATE PROVISIONING

(71) Applicant: CABLE TELEVISION LABORATORIES, INC, Louisville, CO (US)

(72) Inventors: Tao Wan, Louisville, CO (US); Massimiliano Pala, Superior, CO (US); Steven J. Goeringer, Westminster, CO (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 22 days.

(21) Appl. No.: 16/730,741

(22) Filed: Dec. 30, 2019

(65) Prior Publication Data

US 2020/0213848 A1 Jul. 2, 2020

Related U.S. Application Data

(60) Provisional application No. 62/785,868, filed on Dec. 28, 2018.

(51) Int. Cl.
*H04W 12/069* (2021.01)
*H04L 9/32* (2006.01)
*H04W 12/033* (2021.01)
*H04W 12/043* (2021.01)

(52) U.S. Cl.
CPC ......... *H04W 12/069* (2021.01); *H04L 9/3226* (2013.01); *H04L 9/3268* (2013.01); *H04W 12/033* (2021.01); *H04W 12/043* (2021.01)

(58) Field of Classification Search
None
See application file for complete search history.

(56) References Cited

U.S. PATENT DOCUMENTS

| | | | | |
|---|---|---|---|---|
| 7,683,773 B1* | 3/2010 | Goodall | .............. | H04L 63/0892 340/505 |
| 8,756,675 B2* | 6/2014 | StJohns | ................. | H04L 9/3263 726/10 |
| 8,817,757 B2* | 8/2014 | Luo | ........................ | H04W 12/35 370/338 |
| 9,825,938 B2* | 11/2017 | Koster | ................... | H04L 9/3268 |
| 2004/0073785 A1* | 4/2004 | Hurtta | ................. | H04L 63/0892 713/155 |
| 2004/0166874 A1* | 8/2004 | Asokan | ................... | H04L 67/18 455/456.1 |

(Continued)

FOREIGN PATENT DOCUMENTS

CN 107302544 A * 10/2017 ........... H04L 9/3263

*Primary Examiner* — Michael Pyzocha
(74) *Attorney, Agent, or Firm* — Armstrong Teasdale LLP

(57) ABSTRACT

A system for provisioning a device is provided. The system includes a computer device. The computer device is programmed to receive, from a user equipment, a connection request via a layer two connection. The computer device is also programmed to accept the connection request. The computer device is further programmed to receive, from the user equipment, a certificate request via the layer two connection. Additionally, the computer device is programmed to determine a destination for the certificate request, and to route the certificate request to the destination.

18 Claims, 2 Drawing Sheets

(56) References Cited

U.S. PATENT DOCUMENTS

| | | | |
|---|---|---|---|
| 2008/0292105 A1* | 11/2008 | Wan | H04L 67/12 380/282 |
| 2010/0031031 A1* | 2/2010 | Tian | H04L 63/06 713/156 |
| 2012/0297474 A1* | 11/2012 | Zhang | H04W 12/069 726/10 |
| 2014/0013108 A1* | 1/2014 | Pellikka | H04L 63/0807 713/156 |
| 2018/0062857 A1* | 3/2018 | Knafel | H04L 9/3263 |
| 2018/0145905 A1* | 5/2018 | Du | H04L 45/66 |
| 2019/0268767 A1* | 8/2019 | Wu | H04W 12/06 |

* cited by examiner

SYSTEMS AND METHODS FOR SUBSCRIBER CERTIFICATE PROVISIONING

CROSS REFERENCE TO RELATED APPLICATIONS

This application claims the benefit of and priority to U.S. Provisional Patent Application No. 62/785,868, filed Dec. 28, 2018, the entire contents and disclosure of which are incorporated by reference in its entirety.

BACKGROUND

The field of the disclosure relates generally to subscriber certificate provisioning, and more particularly, to systems and methods for provisioning user equipment without requiring IP connectivity or service discovery.

Subscriber certificate provisioning is required before a user equipment device (UE), such as a mobile phone, can be authenticated in 3GPP networks or 3GPP based networks (e.g., CBRS networks). Conventional provisioning techniques are defined in the 3rd Generation Partnership Project (3GPP) Technical Specification (i.e., 3GPP TS 33.220, e.g., v15.3.0) and MulteFire Alliance (MFA) Specification (i.e., MFA TS MF 202). For ease of explanation, both of these technical specifications are further referred to herein as "3GPP" and "MulteFire", respectively, and are additionally incorporated by reference herein in their entireties. Both of the 3GPP and MulteFire provisioning techniques, however, require Internet Protocol (IP) connectivity to enroll the UE with the network.

More specifically, conventional 3GPP techniques require the connecting UE to include a SIM (Subscriber Identity Module) or USIM card, along with preconfigured address information of a Public Key Infrastructure (PKI) portal to first attach to the network to obtain IP connectivity. In this conventional 3GPP network configuration, the UE negotiates a shared key with a Bootstrapping function (BSF) in communication with the PKI portal, where the shared key is based on an Authentication and Key Agreement (AKA) protocol of the 3GPP network. The UE may then use a Hypertext Transfer Protocol (HTTP) with digest authentication to enroll a certificate from the PKI portal with the network. Thus, not only does this conventional 3GPP technique require IP connectivity, but also the use of a SIM or USIM, and the configuration of a service address from the PKI portal.

In many cases, one or more keypairs and/or cryptographic elements are inserted into, or generated by, the secure element of the card prior to provisioning of the UE, such as at or before the time of device or element manufacture. For example, a device manufacturer may purchase a previously-manufactured secure element and integrate the secure element, including the associated credentials of the element, in the final design of the finished device. Subsequently, when the device is purchased (e.g., by a consumer), its packaging removed, and installed within an ecosystem network, a PKI protocol for the device may validate the keys and any associated certificates. In many cases, the UE must connect to a network, obtain an IP address, and transmit an authentication request to the PKI portal to provision the UE and the digital certificate.

However, there are situations where it is advantageous to keep the UE off of the network until after its digital certificate has been properly provisioned. Once a user device has been assigned an IP address and given IP level connectivity to the network, the device may be comprised and misuse the access, potentially to compromise the network. Some systems have protocols to prevent this unauthorized access, but these protocols may be bypassed.

MulteFire, on the other hand, uses a device certificate to run Extensible Authentication Protocol Transport Layer Security (EAP-TLS) with the relevant network to establish a restricted IP connection, but which can only be used for certificate provisioning. According to MulteFire, the UE first must discover the Online Sign-up (OSU) information (i.e., from an OSU server of a Neutral Host Network (NHN). The MulteFire-operable UE further requires a device certificate to engage in anonymous EAP-TLS. Enrollment according to this conventional technique results in a restricted Packet Data Network (PDN) connection useful only for OSU. For conventional MulteFire enrollment, the UE uses Secure HTTP (HTTPS) to request a subscriber certificate from the OSU server (e.g., with Open Mobile Alliance Device Management (OMA-DM), Smart Object Awareness and Adaptation Model eXtensible Markup Language (SOAM XML), etc.).

Conventional MulteFire techniques thus also require IP connectivity, and also capability for service discovery (e.g., from the NHN), a device certificate, and a restricted PDN for the IP connectivity. Furthermore, implementation of conventional MulteFire introduces a new state into the UE and the network (e.g., a sub-state of Enterprise Mobility Management (EMM) Registration), which also may not be desirable.

Accordingly, it is desirable to provide systems and methods for provisioning subscriber certificates and/or enrolling UEs in wireless, W-Fi, cellular, 3GPP, 4G, 5G, 5G-NR, and other interconnecting networks, which avoid the conventional needs for IP connectivity, service discovery, and/or stored portal addresses for the UE to request a certificate.

SUMMARY

In an embodiment, a system is provided for provisioning a device. The system includes a computer device having at least one processor in communication with at least one memory device. The at least one memory device is configured to store a plurality of instructions, which, when executed by the at least one processor, cause the at least one processor to receive, from a user equipment, a connection request via a layer two connection. The instructions further cause the processor to accept the connection request, and receive, from the user equipment, a certificate request via the layer two connection. The instructions further cause the processor to determine a destination for the certificate request, and route the certificate request to the destination.

In an embodiment, a method for provisioning a device includes a step of receiving, from a user equipment at an access point, a connection request via a layer two connection. The method further includes a step of accepting, at the access point, the connection request. The method further includes a step of receiving, from the user equipment at the access point, a certificate request via the layer two connection. The method further includes a step of determining, by the access point, a destination for the certificate request. The method further includes a step of routing, by the access point, the certificate request to the destination.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
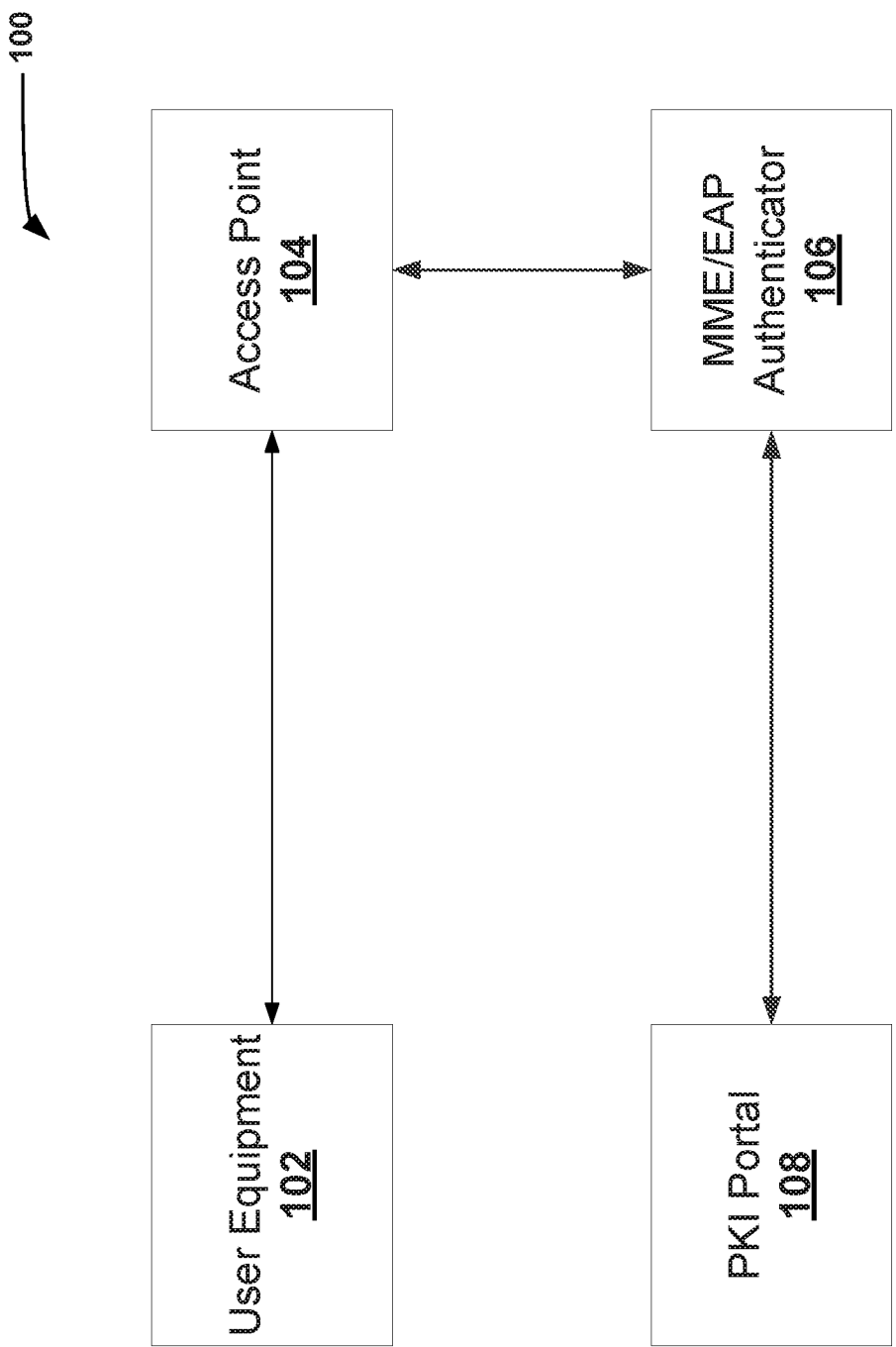
FIG. 1 is a schematic illustration of a system for enhanced provisioning of subscriber certificates for user equipment, in accordance with one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

A Public Key Infrastructure (PKI) uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PM includes policies and procedures for encrypting public keys, as well as the creation, management, distribution, usage, storage, and revocation of digital certificates. The PM binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

The embodiments described herein provide systems and methods for enhanced provisioning of subscriber certificates for UEs. More specifically, the systems and methods described herein provide for provisioning UEs without requiring IP connectivity or service discovery.

In the exemplary embodiment, a UE (also referred to herein as a user device) requests a digital certificate to access a network, such as a cellular network. In some embodiments, the UE includes, but is not limited to, a desktop computer, a laptop computer, a personal digital assistant (PDA), a cellular phone, a smartphone, a tablet, a phablet, or other web-based connectable equipment, such as an Internet of Things (IoT) device. For example, the UE may be a smartphone and the network is a cellular network, such as, but not limited to, a 3GPP network, a 4G network, a 5G network, a 6G network, a MulteFire network, and any other network over which the phone would be trying to communicate. For IoT devices, the network may be private network or a specific network for the individual device or for devices of similar types. For example, the network may be a network for IP cameras produced by a specific company, or IP cameras set-up at a specific location.

However, UEs are not known to be able to directly access the network. In an exemplary embodiment, the UE creates a low level connection with a nearby access point (AP). For example, a mobile phone may use Radio Resource Control (RRC) to connect with a nearby eNodeB for the 3GPP network. The UE uses the connection to transmit a certificate request over EAP (Extensible Authentication Protocol) to the AP. The AP encapsulates the certificate request and transmits the request over the network to an EAP authenticator. The EAP authenticator then decapsulates the certificate request and routes the request to the appropriate PKI portal. When the response is received from the PKI portal, it is encapsulated and routed over EAP to the AP, which then transmits the certificate response to the UE.

FIG. 1 is a schematic illustration of a system 100 includes a UE 102, an AP 104, an MME/EAP authenticator 106, and a PKI portal 108. In an exemplary embodiment, system 100 provides enhanced provisioning of subscriber certificates for UE 102. UE 102 may include, but is not limited to, a desktop computer, a laptop computer, a personal digital assistant (PDA), a cellular phone, a smartphone, a tablet, a phablet, or other web-based connectable equipment, such as an Internet of Things (IoT) device.

In an exemplary embodiment, AP 104 represents a gateway to a network. AP 104 may provide access to a 3GPP network, a 4G network, a 5G network, 6G network, another cellular network, a Wi-Fi network, another wireless network, a wired network, and/or any other network used to provision UE 102. AP 104 may be an eNodeB for a 3GPP and 4G network, a gNodeB for a 5G network, a router for a Wi-Fi network, and/or an antenna for a cellular network. In an exemplary embodiment, UE 102 is capable of connecting to AP 104 using an OSI layer 2 connection. This type of connection is extremely low level, where UE 102 is unable to actually route any message or frame. Instead any message sent is picked up and processed by the next node, which in this case is AP 104.

In the exemplary embodiment, AP 104 is configured with the address of MME/EAP authenticator 106 to allow for the proper routing of any EAP messages that are received by AP 104. EAP messages may be, for example, transmitted over data link layers such as Point-to-Point Protocol (P2P) or IEEE 802, without requiring access to an IP.

The MME/EAP authenticator 106 is configured to authenticate UE 102 by routing requests to one or more PKI portals 108. The PKI portals 108 are configured to provision digital certificates, such as X.509 certificates.

In some embodiments, one or more of the connections between the different parts of the system 100 may be secured channels that automatically encrypt and secure the message traffic between the various components.

Figure 2:
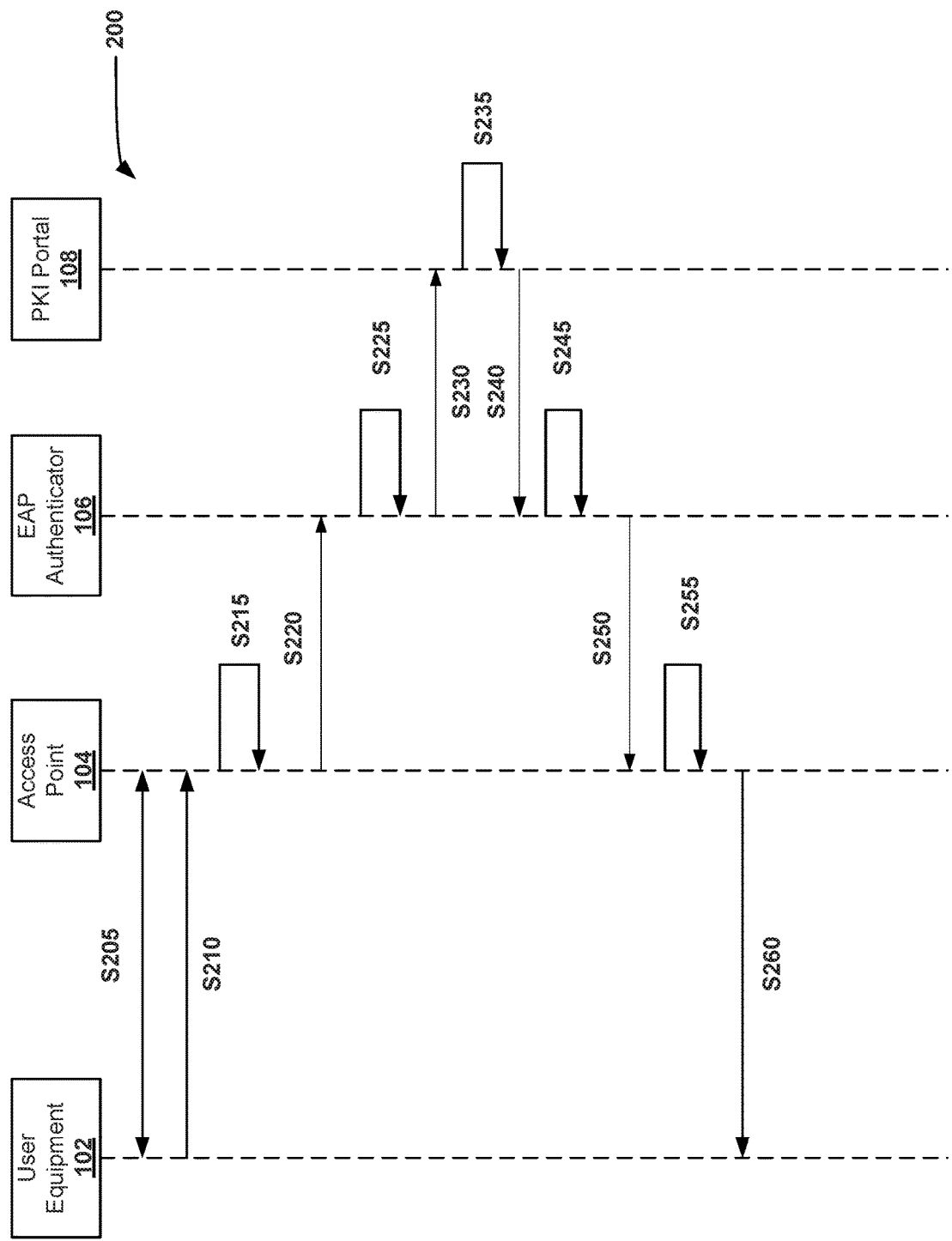
FIG. 2 is data flow diagram of a process of user equipment requesting a subscriber certificate without IP access, in accordance with an embodiment.

FIG. 2 is data flow diagram of a process 200 of UE 102 requesting a subscriber certificate without IP access. In an exemplary embodiment, UE 102 does not include service discovery information that would include IP addresses, such as that of the MME/EAP authenticator 106 and/or the PKI portal 108. In some embodiments, UE 102 does not include a preloaded digital certificate. In at least one embodiment, UE does not require IP connectivity to provision itself with a digital certificate.

In an exemplary embodiment, the user associated with UE 102 receives a PIN number or QR code that UE 102 will use for the certificate request. In other embodiments, the user may have another certificate, such as one obtained for a Wi-Fi network, to bootstrap or provision UE 102.

For the purposes of this discussion, process 200 will be explained in the case where UE 102 is connecting to a 3GPP network. Accordingly, the 3GPP TS 33.220 V15.0.0 dated June 2018 and the 3GPP TS 33.220 V15.3.0 dated September 2018 are incorporated by reference in their entirety.

Nevertheless, process 200 may also be implemented with other network types, including without limitation, a 3GPP network, a 4G network, a 5G network, a MulteFire network, a Wi-Fi network, and/or a wired network.

In an exemplary embodiment, process 200 begins at step S205. In step S205, UE 102 establishes a Radio Resource Control (RRC) connection with AP 104. In an exemplary embodiment of step S205, the connection between UE 102 and AP 104 may be any layer 2 connection that only allows point-to-point connection. In step S210, after the connection is established, UE 102 transmits a certificate request to AP 104 to be routed over EAP to MME/EAP Authenticator 106. The certificate request may be, but is not limited to, a PKCS #10 request, a Certificate Management Protocol (CMP) request, Certificate Management over CMS (CMC) request, an Enrollment over Secure Transport (EST) request, and an Automatic Certificate Management Environment (ACME) request. In an exemplary embodiment of step S210, the certificate request is transmitted over EAP. In some secure embodiments of step S210, the certificate request is transmitted over EAP-Transport Layer Security (EAP-TLS) to provide additional security in the request.

In step S215, AP 104 encapsulates the certificate request. In some embodiments of step S215, AP 104 encapsulates the certificate request as a Non-Access Stratum (NAS) message. In other embodiments of step S215, AP 104 may encapsulate using other protocols, such as, but not limited to, Remote Authentication Dial-In User Service (RADIUS), Signaling Connection Control Part (SCCP), and S1AP.

In step S220, AP 104 routes the encapsulated message to the MME/EAP Authenticator 106. In an exemplary embodiment of step S220, AP 104 knows the address of MME/EAP Authenticator 106. In other embodiments, AP 104 puts the encapsulated message on the network and the message is routed to the nearest MME/EAP Authenticator 106.

In step S225, when the MME/EAP Authenticator 106 receives the encapsulated message, MME/EAP Authenticator 106 removes the encapsulation to access the certificate request from UE 102. In step S230, MME/EAP Authenticator 106 transmits the certificate request to the PKI portal 108. In an exemplary embodiment of step S230, MME/EAP Authenticator 106 transmits the certificate request, e.g., through a HTTP Request. In some embodiments, where UE 102 is non-roaming, MME/EAP Authenticator 106 may be configured with the address information of PKI portal 108. In roaming embodiments, the PIN or scanned QR code may include the home network identifier, which may then be used by MME/EAP Authenticator 106 for routing to PKI portal 108.

In step S235, PKI portal 108 generates a certificate for UE 102. In some embodiments, PKI portal 108 obtains the certificate from a certificate authority (not shown) that is separate from PKI portal 108. In particular embodiments, the PKI portal 108 authenticates the PIN or QR code before issuing the certificate. In step S240, PKI portal 108 routes the certificate response, which includes the certificate, to MME/EAP Authenticator 106, such as through HTTP. In step S245, MME/EAP Authenticator 106 encapsulates the certificate response into a message, and in step S250, routes the certificate response to AP 104 using EAP (e.g., an NAS message). In step S255, AP 104 removes the encapsulation from the message. In step S260, AP 104 then transmits the certificate response back to UE 102 using the same layer 2 protocol for which UE 102 transmitted the original certificate request in step S210.

While the above embodiments describe encapsulating the certificate request at AP 104 before transmitting the request to EAP Authenticator 106, in some embodiments, AP 104 may not encapsulate the certificate request, but instead only forward the certificate request to EAP Authenticator 106. In such cases, steps S215, S225, S245, and S255 may be considered optional within, or even removed from, process 200. In such embodiments, AP 104 may serve to only change the destination address in the header of the certificate request.

In some embodiments, the certificate request is secured by using the public key of the network, for example, by generating a key K. In these embodiments, the certificate request or the EAP message may then be encrypted with the public key of the network. In some embodiments, the digital request is encrypted by UE 102 and/or AP 104. In other embodiments, the certificate request is secured by using the PIN to generate an encryption key.

In some embodiments, there is a secured channel between UE 102 and EAP Authenticator 106. This secured channel may be based on a security association between UE 102 and EAP Authenticator 106 such as, but is not limited to, IPSec or predetermined shared secrets.

In other embodiments, the channel is not secure, but the individual messages are secured.

Systems and methods according to the present embodiments thus achieve significant advantages to, or in comparison with, conventional certificate enrollment techniques (e.g., 3GPP, MulteFire, Hotspot 2.0, etc.). For illustrative purposes, a side-by-side comparison with several conventional technologies is provided below in Table 1.

TABLE 1

| | Present EAP-based Certificate Enrollment | 3GPP | MulteFire | Hotspot 2.0 |
|---|---|---|---|---|
| Bootstrapping Credential | PIN/QR Code obtained offline (e.g., buy from a store) | USIM | See e.g., Hotspot 2.0 | OSU (e.g., via online payment) |
| Requiring IP connectivity | No | Yes | Yes | Yes |
| Requiring service discovery? | No | Yes, or by manually configuring UE | Yes | |
| Protocols | EAP/NAS + HTTP | E2E HTTP | E2E HTTP | E2E HTTP |
| Radio link security | TBD | AKA | EAP-TLS | |

Thus, as illustrated above in Table 1, systems and methods according to the embodiments depicted in FIGS. 1 and 2, even when implemented in a complementary fashion with some conventional techniques, are advantageously capable of avoiding the challenges and disadvantages faced using such conventional techniques by themselves. For example, as shown in Table 1, conventional 3GPP enrollment techniques require USIM, configuration of service addresses (e.g., of a PKI portal), and IP connectivity. Similarly, Multefire enrollment techniques introduce a new state (i.e., a sub-state of EMM Registration) into the UE and the network, and further require service discovery, a device certificate, and a restricted Packet Data Network (PDN) for IP connectivity. All such disadvantages are avoided according to the techniques described herein.

The computer-implemented methods discussed herein may include additional, fewer, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a messaging system for provisioning digital certificates for UEs, that is advantageously disposed within one or more of the computer device, the authenticating server, and a network of one or more responder servers, to provision digital certificates for UEs. The messaging system thus functions as a provisioning system capable of: (i) providing two-way communication with UEs using layer two communication channels; (ii) removing the need for UEs to procure IP addresses prior to provisioning; (iii) preventing UEs from having IP access to networks prior to provisioning; (iv) eliminating the requirement for UEs to have to perform service discovery; and (v) eliminating the requirement for UEs to have preloaded digital certificates for provisioning.

The aspects described herein may be implemented as part of one or more computer components such as a client device and/or one or more back-end components, such as a cloud service server, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

For instance, aspects include analyzing the current status of digital certificates to determine the status of those certificates to allow trust to be built between devices to improve security. Furthermore, these aspects reduce the chance of data compromise and allow for proposer access to computer systems. Without the improvements suggested herein, additional processing and memory usage would be required to perform such activities. Additional technical advantages include, but are not limited to: (i) improved security for networks when provisioning devices; (ii) improved flexibility in the requirements of installed information on UEs prior to provisioning; (iii) removing the need for the UE to have preconfigured shared secrets prior to provisioning; and (iv) allows for handling changing certificate authorities and/or PKI portals. Additional technical advantages are described in other sections of the specification.

The improvements described herein may be achieved by performing one or more of the following steps: a) receive, from a UE, a connection request via a layer two connection, wherein the UE does not possess an IP address, wherein the layer two connection is a Radio Resource Control (RRC) connection; b) accept the connection request; c) receive, from the UE, a certificate request via the layer two connection, wherein the certificate request is transmitted over Extensible Authentication Protocol (EAP), wherein the certificate request includes a PIN or QR code provided by a user, wherein the certificate request is encrypted based on the PIN or the QR code, wherein the certificate request does not include a destination address; d) determine a destination for the certificate request; e) route the certificate request to the destination; f) encapsulate the certificate request prior to routing; g) route the certificate request to an EAP authenticator, wherein the EAP authenticator is configured to route the certificate request to a public key infrastructure (PKI) portal; h) receive a certificate response based on the certificate request; i) transmit the certificate response to the UE via the layer two connection; j) store one or more addresses for authentication servers; and k) determine a destination address for the certificate request based on the stored one or more addresses.

Furthermore, the embodiments described herein improve upon existing technologies, and improve the functionality of computers, by improving the security of provisioning devices and preventing their access to the network before they are fully provisioned. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable security during the device provisioning process, but without compromising data and speed. Furthermore, according to the disclosed techniques, user computer devices are better able to ensure the security of websites and other connected devices, and thereby protecting computer devices from malicious actors.

Exemplary embodiments of systems and methods for provisioning devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for provisioning a user equipment device (UE) for a connective network prior to providing the UE with Internet Protocol (IP) connectivity, the system comprising:
   a computer device disposed between the UE and the connective network, the computer device including at least one processor in communication with at least one memory device,
   wherein the at least one memory device stores a plurality of instructions, which, when executed by the at least one processor, cause the at least one processor to:
   receive, from the UE, a connection request via a layer two connection;
   accept the connection request from the UE at the computer device without connecting the UE to the connective network;
   receive, from the UE, a certificate request via the layer two connection;
   determine a destination for the certificate request;
   route the certificate request to the destination;
   obtain a certificate response from the destination based on the certificate request; and
   transmit the certificate response from the destination to the UE via the layer two connection; and
   enable IP connectivity of the UE to the connective network based on the certificate response transmitted to the UE.

2. The system in accordance with claim 1, wherein the certificate request is transmitted over Extensible Authentication Protocol (EAP).

3. The system in accordance with claim 2, wherein the instructions further cause the at least one processor to encapsulate the certificate request prior to routing.

4. The system in accordance with claim 2, wherein the destination is an EAP authenticator configured to route the certificate request to a public key infrastructure (PKI) portal.

5. The system in accordance with claim 1, wherein the UE does not possess an IP address prior to transmission of the certificate response to the UE.

6. The system in accordance with claim 1, wherein the certificate request includes a PIN or QR code.

7. The system in accordance with claim 6, wherein the certificate request is encrypted based on the PIN or the QR code.

8. The system in accordance with claim 1, wherein the layer two connection is a Radio Resource Control (RRC) connection.

9. The system in accordance with claim 1, wherein the computer device is an eNodeB, and wherein the connective network is a 3GPP network.

10. The system in accordance with claim 1, wherein the certificate request does not include a destination address.

11. The system in accordance with claim 10, wherein the instructions further cause the at least one processor to:

store one or more addresses for authentication servers; and determine a destination address for the certificate request based on the stored one or more addresses.

12. A method for provisioning a user equipment device (UE) for a connective network prior to providing the UE with Internet Protocol (IP) connectivity, the method comprising the steps of:

receiving, from the UE at an access point (AP), a connection request via a layer two connection;

accepting, at the AP, the connection request from the UE without connecting the UE to the connective network;

receiving, from the UE at the AP, a certificate request via the layer two connection;

determining, by the AP, a destination for the certificate request;

routing, by the AP, the certificate request to the destination;

obtaining, at the AP, a certificate response from the destination based on the certificate request;

transmitting, from the AP, the certificate response obtained from the destination to the UE via the layer two connection; and enabling IP connectivity of the UE to the connective network based on the certificate response transmitted to the UE.

13. The method in accordance with claim 12, further comprising steps of:

transmitting, by the user equipment, the certificate request over Extensible Authentication Protocol (EAP);

routing the certificate request to an EAP authenticator;

receiving, by the EAP authenticator, the certificate request; and routing, by the EAP authenticator, the certificate request to a public key infrastructure (PKI) portal.

14. The method in accordance with claim 13 further comprising encapsulating, by the AP, the certificate request prior to routing to the EAP authenticator.

15. The method in accordance with claim 12, further comprising steps of:

receiving, by the UE, at least one of a PIN or QR code; and adding, by the UE, the at least one of a PIN or QR code in the certificate request.

16. The method in accordance with claim 15 further comprising a step of encrypting, by the UE, the certificate request based on the PIN or the QR code.

17. The method in accordance with claim 12, wherein the layer two connection is a Radio Resource Control (RRC) connection, wherein the AP is an eNodeB, and wherein the connective network is a 3GPP network.

18. The method in accordance with claim 12, wherein the certificate request transmitted by the UE does not include a destination address, and wherein the method further comprises steps of:

storing, in the AP, one or more addresses for authentication servers; and determining, by the AP, a destination address for the certificate request based on the stored one or more addresses.

* * * * *